(12) United States Patent
Norridge et al.

(10) Patent No.: US 9,819,616 B2
(45) Date of Patent: Nov. 14, 2017

(54) APPARATUS AND METHOD FOR USE IN A SPACEWIRE-BASED NETWORK

(71) Applicant: ASTRIUM LIMITED, Stevenage (GB)

(72) Inventors: Paul Stephen Norridge, Stevenage (GB); Wayne Sullivan, Stevenage (GB); Mikael Stig Collin, Stevenage (GB)

(73) Assignee: ASTRIUM LIMITED, Stevenage, Hertfordshire (GB)

( * ) Notice: Subject to any disclaimer, the term of this patent is extended or adjusted under 35 U.S.C. 154(b) by 414 days.

(21) Appl. No.: 14/465,331

(22) Filed: Aug. 21, 2014

(65) Prior Publication Data

US 2014/0362861 A1 Dec. 11, 2014
US 2016/0248705 A9 Aug. 25, 2016

Related U.S. Application Data

(63) Continuation of application No. 14/130,181, filed as application No. PCT/EP2012/062198 on Jun. 25, 2012.

(30) Foreign Application Priority Data

Jun. 30, 2011 (EP) ..................................... 11275101

(51) Int. Cl.
*H04L 12/861* (2013.01)
*H04L 29/08* (2006.01)
(Continued)

(52) U.S. Cl.
CPC .......... *H04L 49/9042* (2013.01); *H04L 45/34* (2013.01); *H04L 45/74* (2013.01); *H04L 67/12* (2013.01)

(58) Field of Classification Search
CPC ..... H04L 49/9042; H04L 45/34; H04L 45/74; H04L 67/12
See application file for complete search history.

(56) References Cited

U.S. PATENT DOCUMENTS 4,755,986 A 7/1988 Hirata
6,847,645 B1 * 1/2005 Potter .................... H04L 45/00
370/389

(Continued)

FOREIGN PATENT DOCUMENTS

JP 2003-319322 A 11/2003
JP 2004-289223 A 10/2004

OTHER PUBLICATIONS

International Search Report (PCT/ISA/210) dated Feb. 1, 2013, by the European Patent Office as the International Searching Authority for International Application No. PCT/EP2012/062198.
(Continued)

*Primary Examiner* — Duc C Ho
(74) *Attorney, Agent, or Firm* — Buchanan Ingersoll & Rooney PC (57) ABSTRACT

An apparatus for use in a SpaceWire-based network is configured to send and receive data packets, and process data included in a received data packet. A header of the received data packet is stored in a buffer while the data is being processed, a processed data packet including the stored header and the processed data is generated, and the processed data packet is transmitted. The header of the received data packet may be modified, and the modified header attached to the processed data to generate the processed data packet. When the data packet is received via a first port, the processed data packet may be transmitted via the first port, or may be transmitted via a second port.

16 Claims, 6 Drawing Sheets

(51) Int. Cl.
*H04L 12/721* (2013.01)
*H04L 12/741* (2013.01)

(56) References Cited

U.S. PATENT DOCUMENTS

| | | | |
|---|---|---|---|
| 7,212,530 B1 * | 5/2007 | Lim | H04L 49/3009 370/392 |
| 7,764,672 B2 | 7/2010 | Moriwaki | |
| 2004/0124877 A1 * | 7/2004 | Parkes | H03K 19/17784 326/41 |
| 2005/0010690 A1 * | 1/2005 | Marshall | H04L 29/06 709/246 |
| 2005/0286560 A1 * | 12/2005 | Colman | H04L 29/06 370/474 |
| 2009/0262739 A1 | 10/2009 | Lu | |
| 2014/0362861 A1 * | 12/2014 | Norridge | H04L 45/34 370/392 |

OTHER PUBLICATIONS

Written Opinion (PCT/ISA/237) dated Feb. 1, 2013, by the European Patent Office as the International Searching Authority for International Application No. PCT/EP2012/062198.

Chunjing Mao et al., "Elastic Flow Control and Parallel Switch Design for SpaceWire Router", International Spacewire Conference, Jun. 24, 2010, pp. 259-265.

C. Huitema, "Routing in the Internet", 1995 Prentice Hall PTR, New Jersey US, pp. 224-226.

Communications pursuant to Article 94(3) EPC dated Jun. 6, 2017, by the European Patent Office in corresponding European Patent Application No. 12 729 613.5 (6 pages).

\* cited by examiner

APPARATUS AND METHOD FOR USE IN A SPACEWIRE-BASED NETWORK

RELATED APPLICATIONS

This application is a continuation of U.S. application Ser. No. 14/130,181, filed Dec. 30, 2013 which is a National Stage of PCT/EP2012/062198 filed Jun. 25, 2012 and claims priority from European Patent Application No. 11275101.1 filed Jun. 30, 2011. The entire content of each prior application is hereby incorporated by reference.

FIELD OF THE INVENTION

The present invention relates to an apparatus and method for use in a SpaceWire-based network. In particular, the present invention relates to storing a header of a received data packet while data from the data packet is processed, and generating a processed data packet including the stored header and the processed data.

BACKGROUND OF THE INVENTION

Modern spacecraft typically incorporate a large number of discrete components, to provide a high level of functionality. For example, a spacecraft may include a plurality of sensors, mass memories, processing modules and telemetry subsystems. These are connected to one another via an onboard network, to enable the exchange of data between components. Here, the term spacecraft includes any space-based apparatus such as commercial or scientific satellites, for example communications satellites, and manned or unmanned spacecraft such as interplanetary probes.

A widely-used standard for onboard networks in spacecraft is SpaceWire, defined in the ECSS-E50-12A standard. The original specification has subsequently been revised, for example in the ECSS-E-ST-50-12C standard. Other standards derived from SpaceWire have also been developed. For example, the SpaceFibre standard is based on SpaceWire, but uses fibre-optic and copper cable connections to support higher data rates. In a SpaceFibre network, one physical link carries several virtual communication channels. A further variant of SpaceWire is SoCWire, which is designed for networking components within a system-on-a-chip (SoC). However, networks based on SpaceFibre, SoCWire and other SpaceWire derivatives will still be compliant to the protocols and routing mechanisms defined for SpaceWire, and hence may generally be referred to as SpaceWire-based networks.

An onboard network, such as a SpaceWire or SpaceFibre network, comprises at least two nodes. Nodes may be directly connected, or may be connected via one or more routers. A node which sends a data packet to a destination does so by using routing information that is pre-programmed into the node. This information allows data to get from source to destination. To change the destination of the data packet in any way requires a modification or re-programming of the routing information at the source. For example, if a node is required to forward on a packet after receipt, it does so by use of a locally predetermined destination. Therefore each sending node must be individually reprogrammed in order to change a path taken by a data packet through the network.

SUMMARY OF THE INVENTION

According to the present invention, there is provided an apparatus for use in a SpaceWire-based network, the apparatus comprising an input-output IO module configured to send and receive data packets, a processing module configured to process data included in a received data packet, and a buffer for storing a header of the received data packet whilst the data is being processed by the processing module, wherein the apparatus is configured to generate a processed data packet including the stored header and the processed data, and transmit the processed data packet.

The apparatus may be further configured to modify the header of the received data packet and attach the modified header to the processed data to generate the processed data packet.

The IO module may be configured to receive the received data packet via a first port and transmit the processed data packet via the first port.

The IO module may be configured to receive the received data packet via a first port, wherein the apparatus may be configured to select a second port from a plurality of available ports based on address information included in the header of the received data packet, and wherein the IO module may be configured to transmit the processed data packet via the second port.

The received data packet may comprise at least a header field and a data field, and the apparatus may be configured to identify a boundary between header and data fields of the received data packet by searching for a predefined marker defining the start of the data field.

The received data packet may comprise a sequence of data characters, the predefined marker being the first character in the sequence having a known predetermined value, or the predefined marker may be an $N^{th}$ byte of the received data packet, the header field of the received data packet having a fixed length of N−1 bytes.

The SpaceWire-based network may be configured according to the SpaceWire standard, or according to a SpaceWire derivative including SpaceFibre or SoCWire, the apparatus being configured for use as a node in the network.

According to the present invention there is also provided a SpaceWire-based network comprising a plurality of nodes, at least one of the nodes comprising the apparatus, and a data packet generator for generating data packets to be sent through the network, the data packet generator being configured to include address information in a header of a generated data packet, the address information defining a route through the network passing through at least two of the plurality of nodes.

The data packet generator may include a memory for storing the address information to be included in the header, and the data packet generator may be configured to receive updated address information defining a different route through the network, and replace the stored address information with the updated address information to change the route taken by subsequently generated data packets.

The SpaceWire-based network may further comprise at least one router including a plurality of router ports, each router port being coupled to one of the plurality of nodes.

The plurality of nodes may comprise a plurality of first nodes, each first node comprising the apparatus, and a plurality of second nodes, each second node being configured to discard the header of a received data packet.

The network may be configured to use logical addressing, and the at least one router may be configured to perform header deletion on data packets passing through each router port coupled to one of the first nodes, by deleting a first address character of the data packet header.

The network may be configured to use logical addressing, and each one of the plurality of nodes may be configured to perform header deletion on the received data packet, by deleting a first address character of the data packet header.

The network may be configured to use path addressing, and the at least one router may be configured to perform header deletion on data packets passing through the router by deleting a first address character of the data packet header.

According to the present invention, there is further provided a method for use in a SpaceWire-based network, the method comprising receiving a data packet, storing a header of the received data packet in a buffer, processing data included in the received data packet, generating a processed data packet including the stored header and the processed data, and transmitting the processed data packet.

According to the present invention, there is yet further provided a computer-readable storage medium storing a computer program which, when executed on a processor, causes the processor to perform the method.

BRIEF DESCRIPTION OF THE DRAWINGS

Embodiments of the present invention will now be described, by way of example only, with reference to the accompanying drawings, in which.

DETAILED DESCRIPTION

Figure 1:
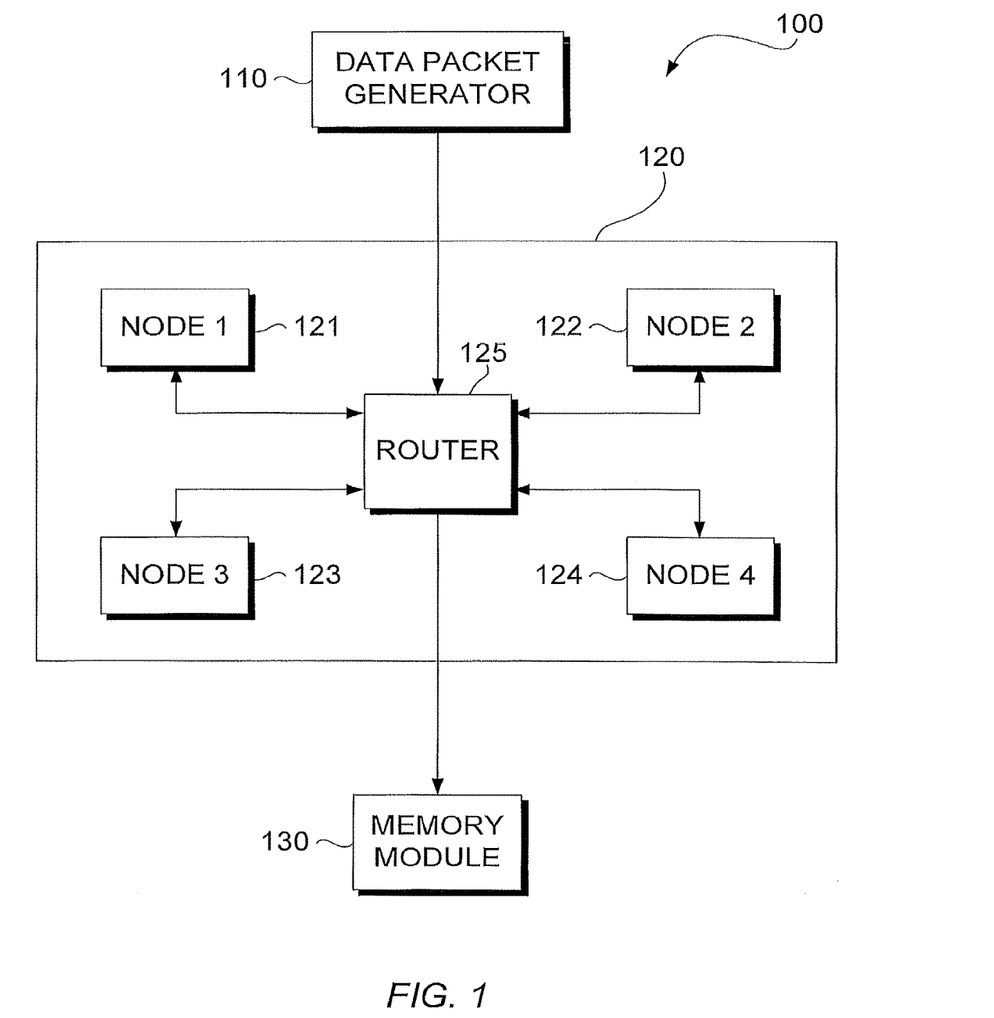
FIG. 1 illustrates a SpaceWire network according to an embodiment of the present invention.

Referring now to FIG. 1, a SpaceWire network is illustrated according to an embodiment of the present invention. In the present embodiment the SpaceWire network is included in a satellite, and enables data collected by onboard instruments to be routed to a plurality of nodes for processing. The processed data is then stored in a memory. The SpaceWire network 100 comprises a data packet generator 110, a processing module 120, and a memory module 130. The processing module 120 includes a first node 121, a second node 122, a third node 123, a fourth node 124, and a router 125. The router 125 is coupled to the first, second, third and fourth nodes 121, 122, 123, 124, and is also coupled to the data packet generator 110 and the memory module 130.

Although in FIG. 1 the first, second, third and fourth nodes 121, 122, 123, 124 and the router 125 are embodied in a single processing module 120, which may for example be a field-programmable gate array (FPGA), in other embodiments some or all of the nodes and the router may be provided as separate units coupled together. Additionally, although in the embodiment of FIG. 1 the SpaceWire network 100 includes four nodes and a single router, in other embodiments of the present invention a SpaceWire network may include any number of nodes and any number of routers.

The data packet generator 110 may, for example, be an analogue-to-digital converter (ADC) which receives an analogue signal from an onboard instrument of the satellite. However, this is only one example, and in general the term "data packet generator" may refer to any component which is configured to generate a data packet in a format suitable for sending across a SpaceWire-compliant network. For instance, data packets may be generated by an ADC, a field-programmable gate array (FPGA), an application-specific integrated circuit (ASIC), a central processing unit (CPU), an instrument or detector such as a charge-coupled device (CCD) or antenna array, and so on.

Continuing with reference to FIG. 1, the data packet generator 110 generates a SpaceWire data packet in which the data to be sent is contained in a cargo portion of the data packet. For instance, when the data packet generator is an ADC, the data to be sent may be a digital value representing an analogue signal. The data packet generator 110 may also include means for determining a suitable route through the network for the data packet. The route defines selected ones of the plurality of nodes that are required for processing the data in the data packet, as well as an order in which the selected nodes should process the data packet. For example, if the data packet generator 110 is configured to receive signals relating to different types of data from a plurality of instruments, different routes may be chosen according to the type of data included in the data packet. The data packet generator 110 constructs a packet header, which defines the chosen route, and sends the data packet to the router 125. The packet header contains address information which may be used by one or more routers and/or nodes to determine a destination to which the data packet should be sent.

When the router 125 receives the data packet from the ADC 110, it forwards the data packet to a port specified by the first address byte in the header of the data packet. In the present embodiment, the router 125 also performs header deletion, by deleting the first address byte from the header before forwarding the data packet on. In embodiments where header deletion is not performed by a router, a node may be configured to delete the first address byte when it receives the data packet.

The data packet is then received by a node which is connected to the port that was specified by the first address byte. In a conventional SpaceWire network, if an address header exists when the data packet arrives at a node, i.e. if the address header has not been deleted by the preceding router, the node is configured to strip the header from the data packet and process the data included in the cargo portion. However, in the present embodiment the header information is not discarded. Instead, the node is configured to store the header in a buffer whilst the data is processed. After the node has processed the data, the header is reattached to the processed data to generate a processed data packet. The node then transmits the processed data packet on the same port through which the original data packet was received.

Because the address information in the header is retained as the data packet is passed from one node to the next, it is possible to define a path that encompasses a plurality of nodes.

Figure 2A:
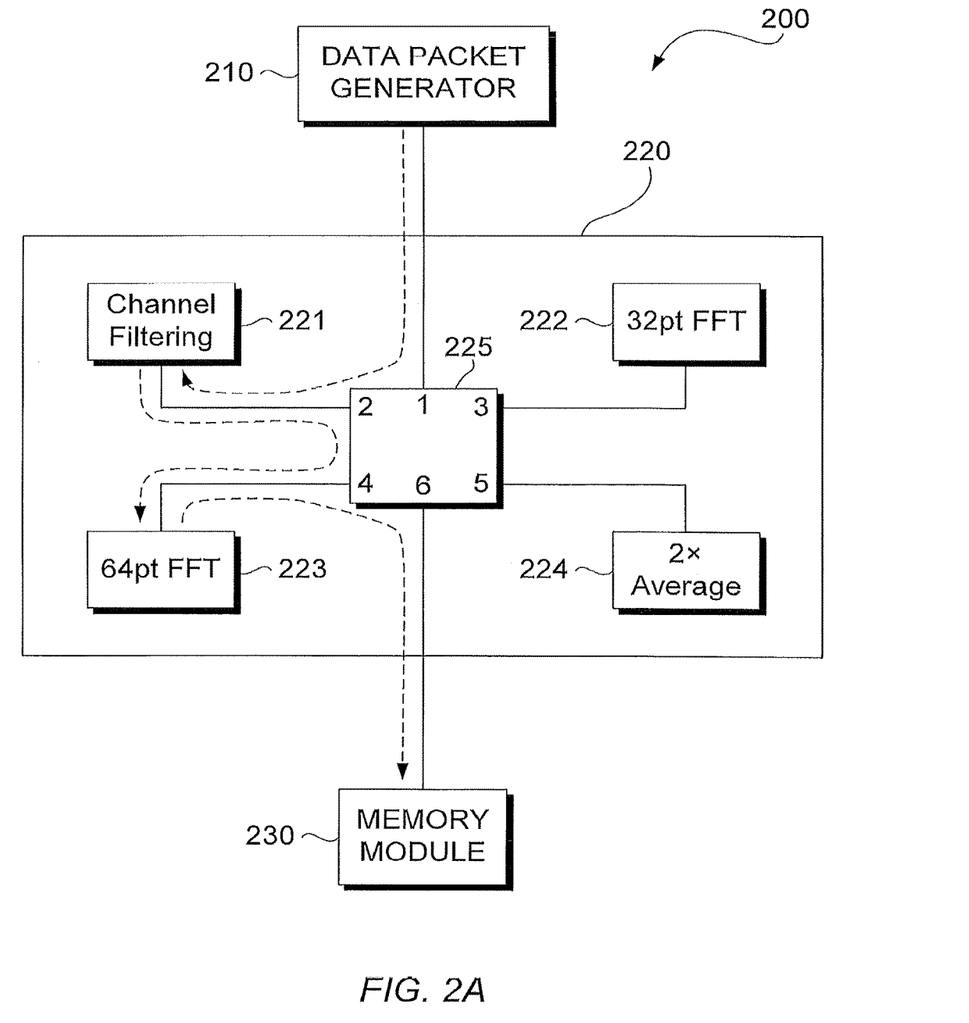
FIGS. 2A and 2B illustrate paths taken by data packets through a SpaceWire network according to an embodiment of the present invention.
Figure 2B:
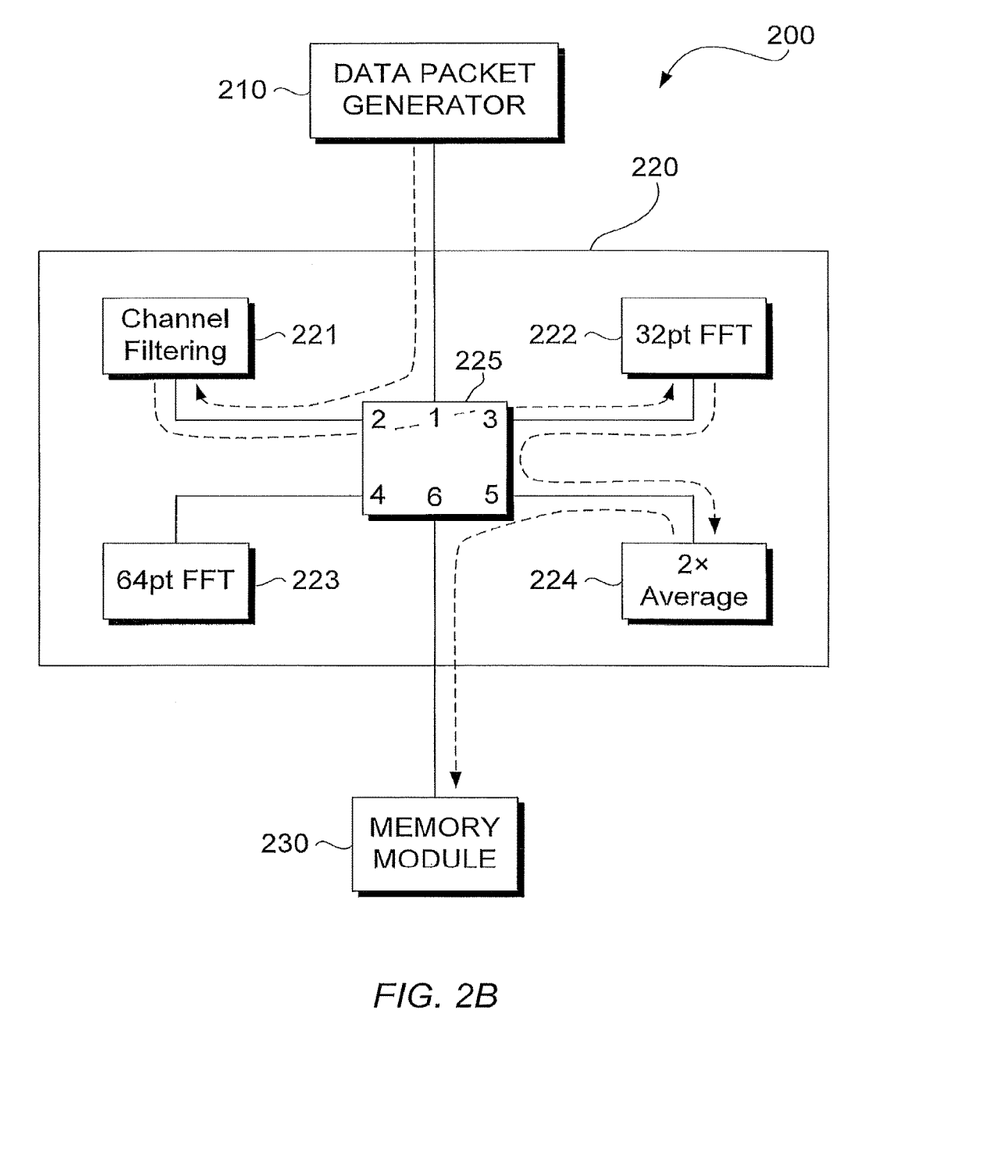

FIGS. 2A and 2B schematically illustrate a SpaceWire network according to an embodiment of the present invention, in which different processing routes through the network can be defined for different data packets without reconfiguring the individual nodes. In FIGS. 2A and 2B, the dashed arrows illustrate a sequence in which the data packet travels from one networked device to the next. Like the network of FIG. 1, the network 200 of FIGS. 2A and 2B comprises a data packet generator 210, a processing module 220, and a memory module 230. The processing module 220 of FIGS. 2A and 2B includes four nodes 221, 222, 223, 224 and a router 225. The nodes comprise a channel filtering node 221, a 32-pt fast Fourier transform (FFT) node 222, a 64-pt FFT node 223 and a 2× averaging node 224.

As shown in FIGS. 2A and 2B, the router 225 includes six ports numbered 1 to 6, each port being coupled to a network component via a SpaceWire link. Port 1 is coupled to the data packet generator, port 2 is coupled to the channel filtering node 221, port 3 is coupled to the 32-point FFT node 222, port 4 is coupled to the 64-point FFT node 223, port 5 is coupled to the 2× averaging node 224, and port 6 is coupled to the memory module 230.

In the present embodiment, as the network is a SpaceWire network, the data packet generator 210 is configured to generate packets according to the SpaceWire standard. In other embodiments where the network is configured according to a different standard, the data packet generator may generate data packets in a suitable format for the particular standard being used. A SpaceWire data packet comprises a header field, a cargo field, and an end-of-packet (EOP) marker, as shown below:

<header><cargo><EOP>

The cargo field contains the data to be processed by a destination node, and hence may also be referred to as a data field. The header field contains the header, which contains address information comprising at least one destination identifier. The header field may be arranged as defined in the SpaceWire standard, or may for example be an extended header as defined in the RMAP protocol extension to Space-Wire. If an RMAP extended header is used, the node may retrieve the stored header and modify the stored header before attaching the modified header to the processed data, to generate the processed data packet. For example, the header of an RMAP data packet includes a 24-bit data length field that contains the length in bytes of the cargo field, i.e. the length in bytes of the data being sent. Therefore if the data length of the outgoing data packet is different to the data length of the originally received packet, the stored header may be modified according to the new data length before the processed data packet is transmitted.

In the present embodiment a path addressing scheme is used, in which each destination identifier corresponds to a router output port number. However, in other embodiments different addressing schemes may be used, for example a logical addressing scheme. When logical addressing is used, each router is provided with a router table that stores a logical address assigned to each networked device, along with a corresponding physical output port to which that device is coupled, whether directly or via one or more other routers. The destination address then comprises a logical address of a node to which the data packet is to be sent, and each router looks up the logical address in its router table to determine which output port the data packet should be sent from.

Also, when logical addressing is used, header deletion can be independently configured for each port on a router. Header deletion, which may also be referred to as byte stripping, refers to deleting the first address byte of a data packet header before forwarding the data packet onwards. Byte stripping may or may not be performed at ports that are coupled to conventional SpaceWire nodes, i.e. nodes which do not store the header of a received data packet, since the received header will be discarded anyway. However, byte stripping should preferably be performed at each port which is coupled to a node that stores the header of a received data packet. This ensures that when the node generates a processed data packet using the same header as the received data packet, and sends the processed data packet back to the router, the processed data packet is not returned directly back to the same node. Alternatively, if byte stripping is not performed at the router, it may instead be performed at the receiving node. For example, the node may delete the first address byte before storing the header, or may store the as-received header and then delete the first address byte when the processed data packet is generated. That is, the node may modify the header before it is stored, or may modify the stored header before it is attached to the processed data to generate the processed data packet.

According to the SpaceWire specification, when path addressing is used, byte stripping is always performed. Therefore, in embodiments of the present invention which are configured to use path addressing, it is not necessary to perform byte stripping at the receiving node since byte stripping will already have been performed by the preceding router.

The data packet generator may include a processor for determining a route to be taken by the data packet. The processor may generate address information to be included in the data packet header, the address information defining the route. The processor may change the route from one packet to the next, according to a particular situation. The data packet generator may be configured to be reprogrammed remotely, to allow the routing programming to be updated after the spacecraft has been launched.

Alternatively, or additionally, the data packet generator may include a memory for storing address information defining a predetermined route, and may generate the data packet header using the stored address information. The data packet generator may further be configured to receive updated address information, and replace the stored address information with the updated address information. This allows an operator to remotely change the destination to which data is sent, by transmitting updated address information to the spacecraft, the updated address information being passed to the data packet generator. In contrast, in a conventional SpaceWire network, each node along the desired route through the network would have to be individually reprogrammed. If the data was to be sent to several nodes in succession, each node would have to be individually configured so that it could correctly route the data to the next node in the sequence. Therefore in the present embodiment, the processing overhead and network traffic can be significantly reduced, since the path through the network can be defined when a data packet is initially generated.

In the example shown in FIG. 2A, the data packet generator 210 generates a data packet which is to be sent to the channel filtering node 221 and the 64-pt FFT node 223 to be processed, the processed data then being sent to the memory module 230 to be stored. As the channel filtering node 221 is coupled to output port 2 of the router 225, a destination identifier of <2> is used to send a data packet to the channel filtering node 221. Similarly, a destination identifier of <3> is used to send the data packet to the 32-pt FFT node 222, and so on. Therefore in FIG. 2A, the following data packet is generated by the data packet generator 210 and sent to the router 225:

<2><4><6><data><EOP>

When the router 225 receives the data packet from the data packet generator, it determines based on the first destination identifier that the data packet should be output on port 2. In the present embodiment the router 225 is configured to perform header deletion, a common feature of conventional SpaceWire networks. Accordingly, the router 225 deletes the first destination identifier before sending the data packet from port 2. The sent data packet therefore has the following structure:

<4><6><data><EOP>

The channel filtering node 221 receives this data packet from the router 225 as it is coupled to output port 2 of the router 225. On receiving the data packet, the channel filtering node 221 strips the header from the data packet and stores the header in a buffer while the cargo data is processed. Then, once the channel filtering node 221 has processed the cargo data, the header is retrieved from the buffer and attached to the processed data to generate a processed data packet. Because the header has been stored in the buffer, the processed data packet has the same header as the received data packet. The channel filtering node 221 then transmits the processed data packet through the same port on which the data packet was originally received, such that the processed data packet is sent back to the router 225. The router 225 therefore receives the following processed data packet:

<4><6><filtered data><EOP>

Because the first destination identifier of the original data packet has been deleted, the second destination identifier of the original data packet is now at the front of the processed data packet. Therefore the router 225 determines based on the second destination identifier that the processed data packet should be output on port 4, and deletes the second destination identifier before sending the data packet from port 4. The sent data packet now has the following structure:

<6><filtered data><EOP>

The 64-pt FFT node 223 receives the processed data packet as it is coupled to output port 4 of the router 225. Like the channel filtering node 221, the 64-pt FFT node 223 is configured to store the header of the received data packet in a buffer whilst processing the data in the cargo field of the received data packet. The 64-pt FFT node 223 is configured to process data by applying a 64-point fast Fourier transform to the data. Then, once the data has been processed, the 64-pt FFT node 223 is configured to generate a new processed data packet by attaching the stored header to the processed data. The new processed data packet has the following structure:

<6><transformed data><EOP>

The router 225 receives the processed data packet from the 64-pt FFT node 223, and determines based on the third destination identifier that the data packet should be output through port 6. Accordingly, the router 225 deletes the third destination identifier and outputs the following data packet from port 6:

<transformed data><EOP>

Finally, the memory module 230, which is coupled to port 6 of the router 225, receives this data packet and stores the transformed data. Although in the present embodiment the final node in the network is a memory module, the present invention is not limited to this particular case. For example, in other embodiments, the data packets may ultimately be sent to a telemetry module for transmission to another spacecraft or to Earth, or sent to an onboard computer configured to act upon the data, for example to change a course of the spacecraft based on the received data.

In the example shown in FIG. 2B, the data packet generator 210 generates a data packet to be sent along a different path to the one shown in FIG. 2A. In FIG. 2B, the data packet is to be sent to the channel filtering node 221, 32-pt FFT node 222, 2× averaging node 224 and memory module 230, in that order. The channel filtering node 221, 32-pt FFT node 222, 2× averaging node 224 and memory module 230 are coupled to ports 2, 3, 5 and 6 respectively, and accordingly the following data packet is generated by the data packet generator 210:

<2><3><5><6><data><EOP>

This header causes the data packet to be routed to the channel filtering node 221, 32-pt FFT node 222, 2× averaging node 224 and memory module 230 in that order. The specific operation of the router 225 and nodes 221, 222, 224 is similar to that described above with reference to FIG. 2A, and so a detailed description is omitted here to maintain brevity.

Because each node stores the header of a received data packet, and uses the stored header as the header for an outgoing processed data packet, a destination for the processed data can be specified in the original data packet, rather than being selected by the node itself. This allows the data packet generator 210 to include address information that defines a path that passes through two or more nodes. Therefore, data packets can be made to follow different paths through the onboard network 200 by changing the address information initially included in the data packet by the data packet generator 210. In contrast, in a conventional network, a data packet generator can only specify an initial destination node for the data packet, and a subsequent destination node for the processed data to be sent to has to be specified by the node itself. Therefore in a conventional network, it would be necessary to individually reprogram the nodes in order to change the path taken by a data packet through the network.

Embodiments of the present invention can therefore enable more flexible and more efficient routing of data through an onboard network in a spacecraft.

Figure 3:
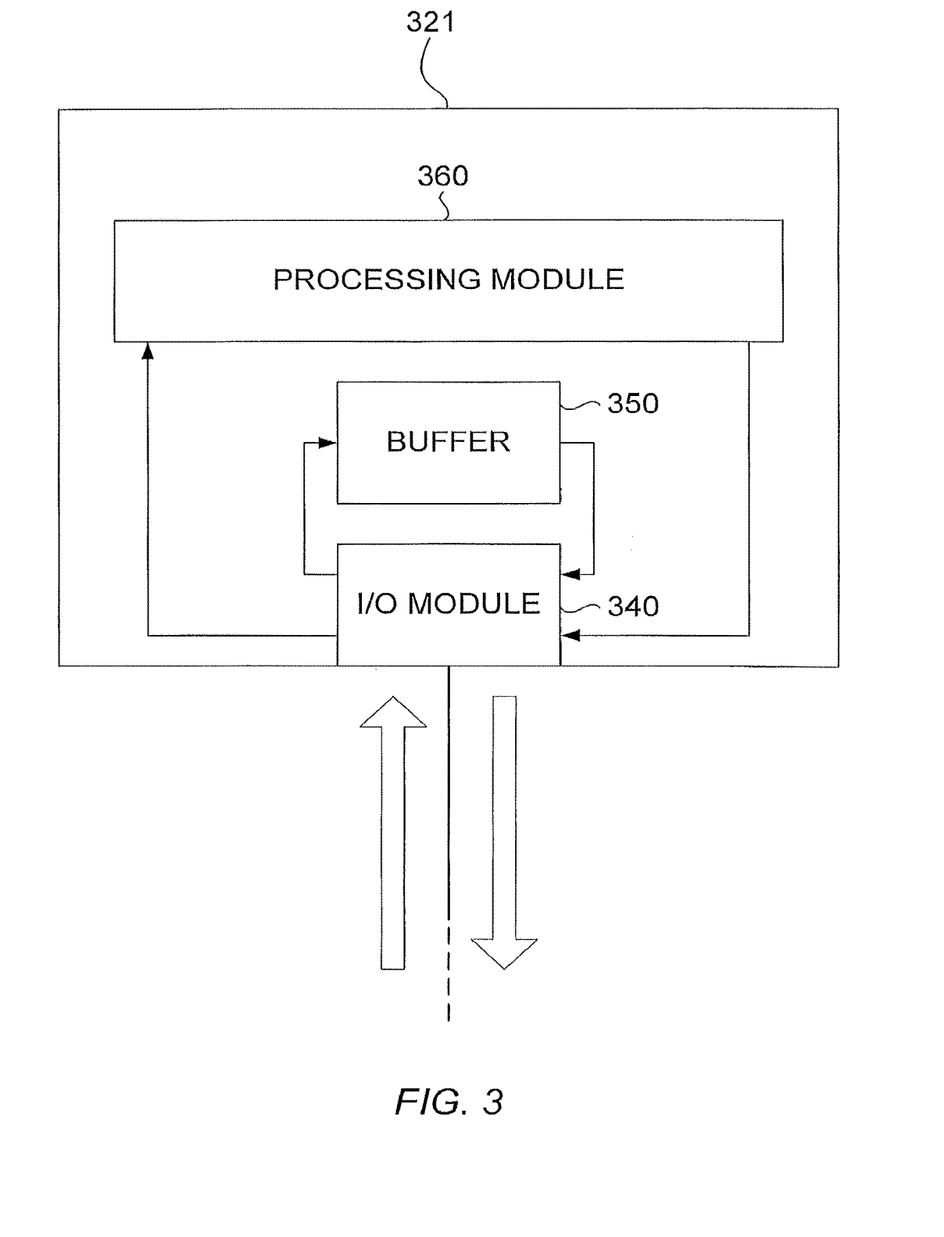
FIG. 3 illustrates an apparatus for use as a node in a SpaceWire-based network, according to an embodiment of the present invention.

Referring now to FIG. 3, apparatus for use as a node in a SpaceWire-compliant network is schematically illustrated, according to an embodiment of the present invention. The node 321 comprises an input/output (I/O) module 340, a processing module 350, and a buffer 360. The structure shown in FIG. 3 would be suitable for use in any of the nodes of FIGS. 1, 2A and 2B.

The I/O module 340 is configured to send and receive data packets to and from the network. In the present embodiment, as the node 321 is configured for use in a SpaceWire network, the I/O module 340 is a SpaceWire codec configured to decode received SpaceWire data packets, and generate SpaceWire data packets to be transmitted. When the I/O module 340 receives a data packet from the network, for example from the router 225 of FIG. 2A, the I/O module 340 is arranged to strip the header from the cargo data and send the cargo data to the processing module 360. Instead of discarding the header, as would happen in a conventional SpaceWire node, the I/O module 340 sends the header to the buffer 350 to be stored whilst the cargo data is processed by the processing module 360.

The apparatus may be configured to identify a boundary between the header and cargo fields by searching for a predefined marker identifying the start of the cargo field. For example, in an embodiment of the present invention in which only path addressing is used, characters in the address field will have values between 0 and 31 since path addressing is limited to a maximum of 32 ports. In this case, the data packet generator may include a data character with a value of greater than 31 at the start of the cargo field, and the I/O module 340 can be configured to determine that the end of the header field has been reached when it encounters the first data character having a value of greater than 31. In other embodiments, another predetermined value may be used to identify the beginning of the cargo field. For example, when logical addressing is used, the network may be configured so that the logical addresses used are restricted to the values 32 to 250, and a value of greater than 250 may be selected for the predefined marker. These values are only exemplary, and other values may be used in other embodiments. In general terms, the I/O module 340 may be configured to search for a marker having a predetermined value, which denotes the boundary between the header and cargo fields, wherein the predetermined value is a value that will not be used for preceding characters of the header field.

In certain embodiments, a network may be configured such that all data packets are sent to the same final destination node, for example a mass memory module, which may be termed the "final node". That is, different data packets may follow different paths through the network, passing through different processing nodes, but the different paths all ultimately lead to the final node. In such embodiments, when logical addressing is used, a logical address of the final node may be used as the predefined marker since this represents the final destination of the data packet, and hence there should not be any address bytes after an address byte corresponding to the logical address of the final node.

Alternatively, instead of using a certain value to identify the end of the header field and start of the cargo field, the data packet generator may be configured to always generate data packets having a fixed header length. If not all of the available characters are required for the address information in a given data packet, the remaining unused characters may be filled with zeroes. In such embodiments, a node can identify the boundary between the header and cargo fields because the boundary will always occur at the same point in the data packet, since the header will always be of the same length. If this method is used along with header deletion, a node should be configured to pad the header to the correct length whenever a byte is deleted. Alternatively, the padding could be performed at a router.

The processing module 360 is configured to perform a specific processing task on the data. The nature of the task may vary from one node to the next. For example, in FIG. 2A, the channel filtering node 221 includes a processing module configured to perform channel filtering on received data, in order to remove unwanted frequencies. The 32-pt FFT node 222 and 64-pt FFT node 223 include processing modules configured to perform fast Fourier transforms by sampling 32 or 64 data points, respectively. The 2× averaging node 224 includes a processing module configured to perform averaging over two full frames of data, i.e. to collect two samples of the same data point and calculate an average value. However, the present invention is not limited to these particular functions, and in other embodiments nodes may be configured to perform different operations on received data.

When the processing module 360 has finished processing the data, the processing module 360 sends the processed data to the I/O module 340. The I/O module 340 is configured to read the stored header from the buffer 350, and attach the header to the processed data to generate a processed data packet. The I/O module 340 then sends the processed data packet via the same port through which the data packet was originally received. That is, if the node 321 includes a plurality of ports from which data packets can be sent, and the data packet including the data to be processed is received via a first port of the plurality of ports, the I/O module 340 is configured to send the processed data packet via the first port.

In general terms, control functions such as identifying a boundary between the header field and data (i.e. cargo) field, reading the stored header, and generating a processed data packet, may be performed by various components within the node 321. For example, in the present embodiment, these functions are described as being executed by the I/O module 340. However, in other embodiments, such control functions may be executed by the processing module 360, or by a separate control module (not shown in FIG. 3).

Figure 4:
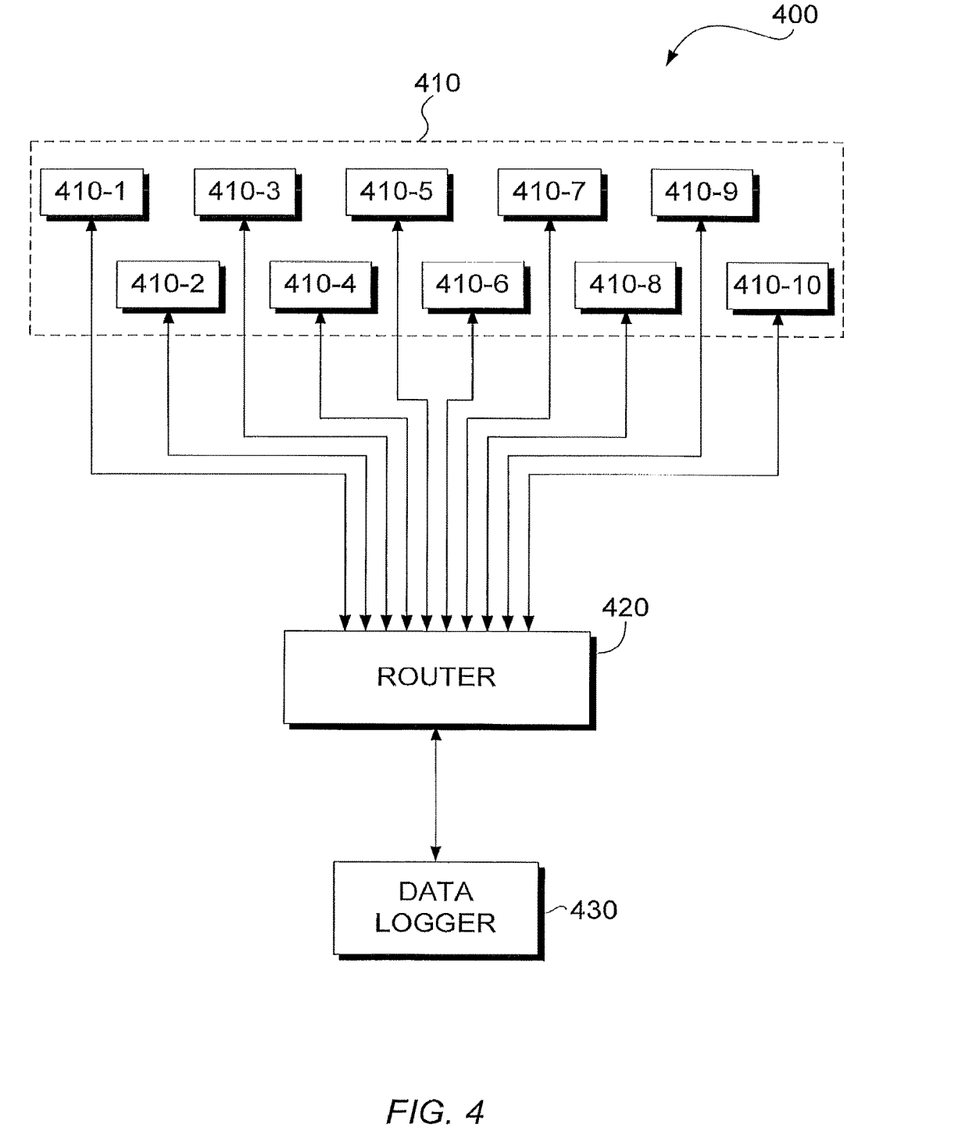
FIG. 4 illustrates a SpaceWire network onboard a spacecraft, according to an embodiment of the present invention.

Referring now to FIG. 4, an onboard SpaceWire network of a spacecraft is illustrated, according to an example of the present invention. The network illustrated in FIG. 4 is shown by way of example only, and the present invention is not limited to this particular arrangement.

The spacecraft comprises a plurality of instruments 410 coupled to a router 420, which is further coupled to data logger 430. The data logger 430 is a memory for storing raw and processed data received from the instruments 410. As shown in FIG. 4, each one of the plurality of instruments 410-1 to 410-10 is connected to the router 420 by a SpaceWire link. The router 420 is further coupled to the data logger 430 by a SpaceWire link. Data packets can be sent from one instrument to another as well as to the data logger 430, and can also be routed via the data logger 430, whereby data is copied to the data logger 430 before being routed onwards.

Each one of the plurality of instruments 410-1 to 410-10 may include a data packet generator for generating SpaceWire data packets to be sent over the network. Therefore each instrument can determine where its own data should be sent to. For example, at certain times it may be necessary for several of the instruments 410-1 to 410-10 to exchange data between one another via the data logger 430, whilst at other times the data may be sent directly to the data logger 430 to be stored. The data logger 430 may be configured as a node similar to the one shown in FIG. 3, wherein the processing module is configured to store the received data in a storage module of the data logger 430. If the data logger 430 is not the final destination of the data packet, i.e. if the data packet header includes other destination identifiers, the data logger 430 would then reattach the original data to the stored header to forward the data packet on to the next destination.

Figure 5:
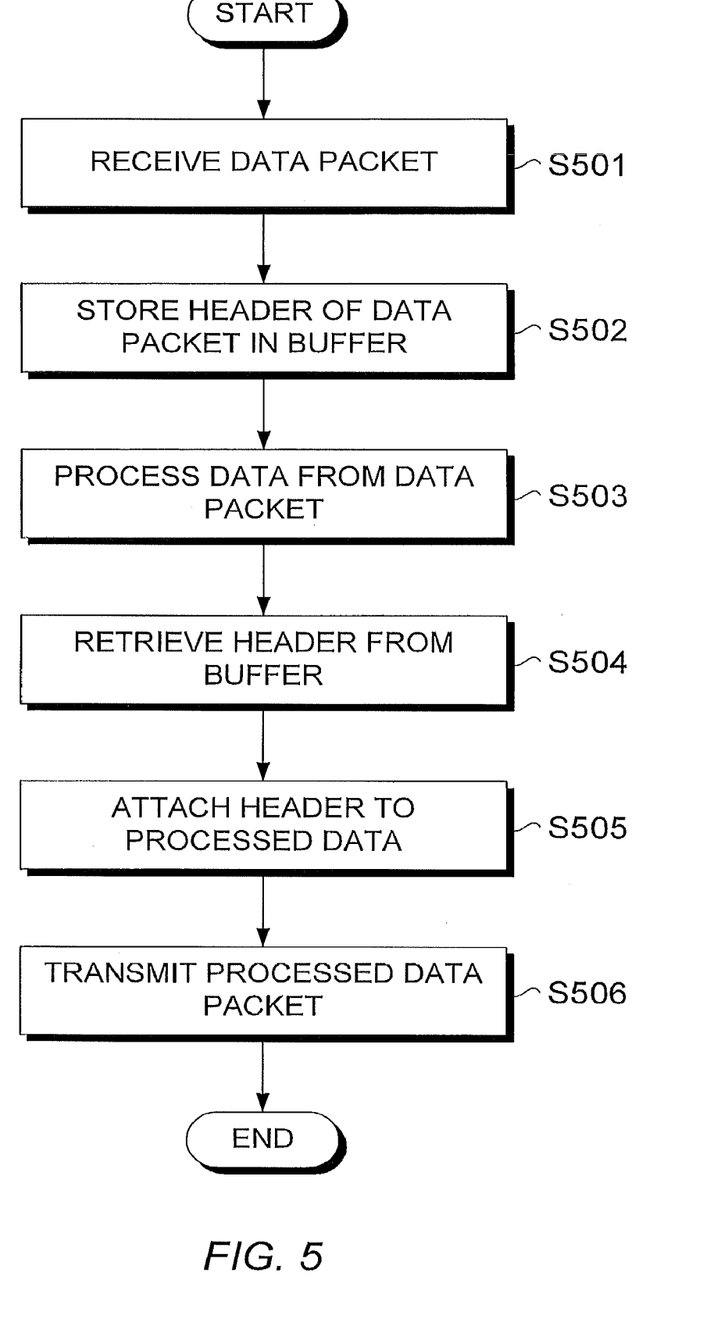
FIG. 5 is a flowchart illustrating a method of processing a received data packet at a node, according to an embodiment of the present invention.

Referring now to FIG. 5, a method of processing a data packet is illustrated according to an embodiment of the present invention. The method is suitable for use in a node such as the one shown in FIG. 3. Firstly, in step S501, a data packet is received from another device over a network, for example from a node or router over a SpaceWire link. Then, in step S502, the header is stripped from the data packet and stored in a buffer. Next, in step S503, the data is processed by a processing module, which may be configured to perform a predetermined task on the data, such as filtering the data or applying a FFT to the data. Once the data is processed, the header is retrieved from the buffer in step S504. Then, in step S505, a processed data packet is generated by attaching the stored header to the processed data. In particular, when the method is used in a SpaceWire network and the data packet is a SpaceWire data packet, the stored header is included in the header field of the processed data packet, and the processed data is included in the cargo field of the processed data packet. Finally, in step S506, the processed data packet is transmitted over the network.

Although embodiments of the present invention have been described in which a node receives a data packet and transmits a processed data packet via the same I/O port, in other embodiments this may not be the case. For example, a node may include a plurality of available I/O ports. In such embodiments, when a data packet is received via a first port of the plurality of ports, the apparatus may be configured to select a second port of the plurality of ports based on address information in the header of the data packet, i.e. based on a destination identifier of the header which defines one of the plurality of available ports. The processed data packet can then be transmitted via the second port instead of the first port. Alternatively, the processed data packet can still be transmitted via the first port, for example if this is the port specified by the address information. In such embodiments, the apparatus can delete the destination identifier defining the second port from the header of the processed data packet, before transmitting the processed data packet via the second port.

Also, although in FIG. 3 an embodiment is illustrated in which separate buffer, processing and I/O modules are shown. Here, the term "module" may refer to software modules, or to physically distinct hardware modules. In other embodiments the functionality of these modules may be combined into a single module or further divided amongst a plurality of modules. For example, one or more of the buffer, processing and I/O modules may be implemented in a field-programmable gate array (FPGA) chip, or in an application-specific integrated circuit (ASIC).

Furthermore, embodiments of the present invention have been described in which nodes in a network are configured to cache a header of a received data packet. However, the present invention is not limited to use in networks which solely comprise nodes configured in this way. In some embodiments, nodes such as the one shown in FIG. 3 may co-exist in a network with conventional SpaceWire-type nodes which do not cache the header of a received data packet. That is, a SpaceWire-based network according to an embodiment of the present invention comprises one or more nodes which are configured to store headers of received data packets, and may further comprise one or more conventional nodes.

Although embodiments of the present invention have been described in relation to SpaceWire networks, the invention is not limited to use with the SpaceWire standard. In general terms, embodiments of the present invention may be suitable for use in any SpaceWire-based network, for example a network configured according to the SpaceWire standard, or according to a SpaceWire derivative including SpaceFibre or SoCWire.

Also, although embodiments have been described in which nodes and routers are directly connected to one another, in other embodiments one or more of the physical links may be replaced with a wireless connection.

Whilst certain embodiments of the present invention have been described above, the skilled person will understand that many variations and modifications are possible without departing from the scope of the invention as defined by the accompanying claims.

The invention claimed is:

1. Apparatus for use in a SpaceWire-based network, the apparatus comprising:
   an input-output IO module configured to send and receive data packets;
   a processing module configured to process data included in a received data packet; and
   a buffer for storing a header of the received data packet whilst the data is being processed by the processing module,
   wherein the apparatus is configured to generate a processed data packet including the stored header and the processed data, and transmit the processed data packet,
   wherein the received data packet includes at least a header field and a data field,
   wherein the apparatus is configured to identify a boundary between header and data fields of the received data packet by searching for a predefined marker defining the start of the data field,
   wherein the received data packet comprises a sequence of data characters, the predefined marker being the first character in the sequence having a known predetermined value, or
   wherein the predefined marker is an Nth byte of the received data packet, the header field of the received data packet having a fixed length of N−1 bytes.

2. The apparatus of claim 1, wherein the apparatus is further configured to modify the header of the received data packet and attach the modified header to the processed data to generate the processed data packet.

3. The apparatus of claim 2, wherein the IO module is configured to receive the received data packet via a first port and transmit the processed data packet via the first port.

4. The apparatus of claim 3, wherein the SpaceWire-based network is configured according to the SpaceWire standard or according to a SpaceWire derivative including SpaceFibre or SoCWire, the apparatus being configured for use as a node in the network.

5. The apparatus of claim 2, wherein the IO module is configured to receive the received data packet via a first port,
   wherein the apparatus is configured to select a second port from a plurality of available ports based on address information included in the header of the received data packet, and
   wherein the IO module is configured to transmit the processed data packet via the second port.

6. The apparatus of claim 1, wherein the IO module is configured to receive the received data packet via a first port and transmit the processed data packet via the first port.

7. The apparatus of claim 1, wherein the IO module is configured to receive the received data packet via a first port,
   wherein the apparatus is configured to select a second port from a plurality of available ports based on address information included in the header of the received data packet, and
   wherein the IO module is configured to transmit the processed data packet via the second port.

8. The apparatus of claim 1, wherein the SpaceWire-based network is configured according to the SpaceWire standard or according to a SpaceWire derivative including SpaceFibre or SoCWire, the apparatus being configured for use as a node in the network.

9. A SpaceWire-based network (220) comprising:
   a first node including an input-output IO module configured to send and receive data packets, a processing module configured to process data included in a received data packet, and a buffer for storing a header of the received data packet whilst the data is being processed by the processing module, wherein the first node is configured to generate a processed data packet including the stored header and the processed data, and transmit the processed data packet;
   a second node configured to receive the processed data packet from the first node; and
   a data packet generator (210) for generating data packets to be sent through the network, the data packet generator being configured to include address information in a header of a generated data packet, the address information defining a route through the network passing from the first node to the second node, wherein the data packet generator includes a memory for storing the address information to be included in the header, and wherein the data packet generator is configured to receive updated address information defining a different route through the network, and replace the stored address information with the updated address information to change the route taken by subsequently generated data packets.

10. The SpaceWire-based network of claim 9, further comprising:

at least one router (225) including a plurality of router ports, each router port being coupled to one of the first or second nodes.

11. The SpaceWire-based network of claim 10, wherein the second node is configured to discard the header of a received data packet.

12. The SpaceWire-based network of claim 11, wherein the network is configured to use logical addressing, and the at least one router is configured to perform header deletion on data packets passing through each router port coupled to one of the first nodes, by deleting a first address character of the data packet header.

13. The SpaceWire-based network of claim 9, wherein the network is configured to use logical addressing, and each one of the plurality of nodes is configured to perform header deletion on the received data packet, by deleting a first address character of the data packet header.

14. A method for use in a SpaceWire-based network, the method comprising:

receiving a data packet over the network, the data packet including at least a header field and a data field;

identifying a boundary between the header and data fields of the received data packet by searching for a predefined marker defining the start of the data field;

storing the header field of the received data packet in a buffer;

processing data included in the data field of the received data packet;

generating a processed data packet including the stored header field and the processed data; and transmitting the processed data packet, wherein the received data packet comprises a sequence of data characters, the predefined marker being the first character in the sequence having a known predetermined value, or wherein the predefined marker is an Nth byte of the received data packet, the header field of the received data packet having a fixed length of N−1 bytes.

15. A computer-readable storage medium non-transitory storing a computer program which, when executed on a processor, causes the processor to perform the method of claim 14.

16. A SpaceWire-based network comprising:

a first node including the apparatus according to claim 4, the first node being configured to process data included in a received data packet;

a second node configured to receive the processed data packet from the first node; and a data packet generator for generating data packets to be sent through the network, the data packet generator being configured to include address information in a header of a generated data packet, the address information defining a route through the network passing from the first node to the second node.

* * * * *